United States Patent
Wang et al.

(10) Patent No.: US 10,454,383 B1
(45) Date of Patent: Oct. 22, 2019

(54) BIDIRECTIONAL RESONANT DIRECT CURRENT-DIRECT CURRENT CONVERSION CIRCUIT AND UNINTERRUPTIBLE POWER SUPPLY

(71) Applicant: Vertiv Corporation, Columbus, OH (US)

(72) Inventors: Shanwei Wang, Shaanxi (CN); Baoshan Shen, Shaanxi (CN); Zhihong Yao, Shaanxi (CN)

(73) Assignee: Vertiv Corporation, Columbus, OH (US)

( * ) Notice: Subject to any disclaimer, the term of this patent is extended or adjusted under 35 U.S.C. 154(b) by 0 days.

(21) Appl. No.: 16/248,298

(22) Filed: Jan. 15, 2019

(30) Foreign Application Priority Data

Apr. 25, 2018 (CN) .......................... 2018 1 0381251

(51) Int. Cl.
*H02M 3/335* (2006.01)
*H02J 9/04* (2006.01)

(52) U.S. Cl.
CPC .......... *H02M 3/33584* (2013.01); *H02J 9/04* (2013.01)

(58) Field of Classification Search
CPC ......... H02M 3/33584; H02M 3/33569; H02M 3/33523; H02J 9/04; H02J 2009/063
USPC ... 363/16–20, 21.02, 21.06, 37, 26, 98, 127, 363/132; 307/64, 67
See application file for complete search history.

(56) References Cited

U.S. PATENT DOCUMENTS

| | | | | |
|---|---|---|---|---|
| 8,363,427 B2* | 1/2013 | Anguelov | ......... | H02M 3/33584 363/127 |
| 8,842,448 B2* | 9/2014 | Ye | ..................... | H02M 3/33569 363/21.02 |
| 2012/0112547 A1* | 5/2012 | Ghosh | ..................... | H02J 9/062 307/66 |
| 2017/0104365 A1* | 4/2017 | Ghosh | ................. | H02M 1/4241 |
| 2018/0294732 A1* | 10/2018 | Ye | ..................... | H02M 3/33546 |

* cited by examiner

*Primary Examiner* — Rajnikant B Patel
(74) *Attorney, Agent, or Firm* — Harness, Dickey & Pierce, P.L.C.

(57) ABSTRACT

A bidirectional resonant current-direct current conversion circuit and an uninterruptible power supply are provided. The bidirectional resonant current-direct current conversion circuit includes a full-bridge conversion module, a transformer, and a half-bridge conversion module. The full-bridge conversion module is coupled to the half-bridge conversion module via the transformer. The full-bridge conversion module is configured to convert two-level direct current power into alternating current power, and the half-bridge conversion module is configured to convert the alternating current power outputted by the full-bridge conversion module into three-level direct current power. The half-bridge conversion module is further configured to convert three-level direct current power into alternating current power, and the full-bridge conversion module is further configured to convert the alternating current power outputted by the half-bridge conversion module into two-level direct current power.

18 Claims, 9 Drawing Sheets

BIDIRECTIONAL RESONANT DIRECT CURRENT-DIRECT CURRENT CONVERSION CIRCUIT AND UNINTERRUPTIBLE POWER SUPPLY

This application claims the benefit and priority of Chinese Application No. 201810381251.7, filed on Apr. 25, 2018, the entire disclosure of which is incorporated herein by reference.

FIELD

The present disclosure relates to the technical field of circuits, and in particular to a bidirectional resonant direct current-direct current (DC-DC) conversion circuit and an uninterruptible power supply (UPS).

BACKGROUND

In the conventional technology, the bidirectional resonant DC-DC conversion circuit generally has a topology structure of two-level direct current input/output on one side and two-level DC output/input on the other side. Therefore, mutual conversion between the single direct current bus and dual direct current bus cannot be achieved by using the topology structure. For example, the topology structure cannot be applied in a scenario where a two-line battery is connected to a three-level UPS.

Therefore, it is desired to provide a new bidirectional resonant DC-DC conversion circuit to solve the above problems.

SUMMARY

There are provided a bidirectional resonant DC-DC conversion circuit and a UPS according to embodiments of the present disclosure, to solve the problem that conversion between two-level direct current power and three-level direct current power cannot be achieved by using the existing bidirectional resonant DC-DC conversion circuit.

The bidirectional resonant DC-DC conversion circuit according the embodiment of the present disclosure includes a full-bridge conversion module, a transformer, and a half-bridge conversion module. The full-bridge conversion module is coupled to the half-bridge conversion module via the transformer. The full-bridge conversion module is configured to convert two-level direct current power into alternating current power, and the half-bridge conversion module is configured to convert the alternating current power outputted by the full-bridge conversion module into three-level direct current power. The half-bridge conversion module is further configured to convert three-level direct current power into alternating current power, and the full-bridge conversion module is further configured to convert the alternating current power outputted by the half-bridge conversion module into two-level direct current power.

The UPS according to the embodiment of the present disclosure includes the bidirectional resonant DC-DC conversion circuit described above.

The present disclosure has the following beneficial effects.

A bidirectional resonant DC-DC conversion circuit and a UPS including the conversion circuit are provided according to the embodiments of the present disclosure. The bidirectional resonant DC-DC conversion circuit includes a full-bridge conversion module, a transformer, and a half-bridge conversion module. The full-bridge conversion module is coupled to the half-bridge conversion module via the transformer. The full-bridge conversion module is configured to convert two-level direct current power into alternating current power, and the half-bridge conversion module is configured to convert the alternating current power outputted by the full-bridge conversion module into three-level direct current power. The half-bridge conversion module is further configured to convert three-level direct current power into alternating current power, and the full-bridge conversion module is further configured to convert the alternating current power outputted by the half-bridge conversion module into two-level direct current power. In this way, the mutual conversion between the two-level and the three-level can be achieved. Further, since the half-bridge topology is used on one side, fewer switching devices are used, and space and hardware costs can be saved, which is in line with miniaturization of a switching power supply.

BRIEF DESCRIPTION OF THE DRAWINGS

In order to more clearly illustrate technical solutions in embodiments of the present disclosure, the drawings used in the description of the embodiments are briefly described below. It is apparent that the drawings in the following description show only some embodiments of the present disclosure, and other drawings may be obtained by those skilled in the art based on the drawings without any creative efforts.

DETAILED DESCRIPTION OF EMBODIMENTS

In order to make objects, technical solutions and advantages of the present disclosure more clear, the present disclosure is further described in detail below with reference to the drawings. It is apparent that the described embodiments are only some embodiments of the present disclosure, rather than all embodiments. All other embodiments obtained by those skilled in the art based on the embodiments of the present disclosure without creative efforts fall in the protection scope of the present disclosure.

EMBODIMENTS

In many fields, such as energy storage technology, demands for conversion between single direct current and dual direct current become more and more urgent. For example, many UPS manufacturers have introduced three-level UPSs, which further improves the efficiency of high-frequency UPS. However, power frequency UPSs or two-level UPSs are used in most of previous equipment rooms. In this case, used batteries are two-line batteries, that is, the battery includes only a positive electrode and a negative electrode. Since the conversion between the single direct current bus and the dual direct current bus cannot be achieved by using an existing bidirectional resonant DC-DC conversion circuit, the battery portion needs to be rewired when the equipment room is upgraded and is configured with the three-level UPS devices.

For another example, in the field of new energy, a solar energy device at the user side can generate electrical energy by using light energy, for use by a power device at the user side. When the electrical energy generated by the user side is large, the excess electrical energy may be supplied to a grid, which is generally a three-phase grid. If a two-line energy storage device is configured at the user side, the electrical energy generated by the user side cannot be inputted to the grid.

Figure 1:
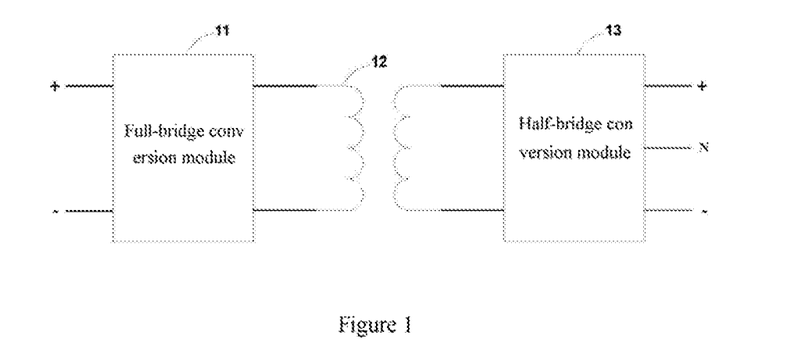
FIG. 1 is a schematic diagram showing a structure of a bidirectional resonant DC-DC conversion circuit according to an embodiment of the present disclosure.

Therefore, there is a need for a new DC-DC conversion circuit achieving the conversion between the two-level and the three-level, so as to meet these application scenarios. A bidirectional resonant DC-DC conversion circuit is provided according to an embodiment of the present disclosure. Reference is made to FIG. 1, which is a schematic diagram showing a structure of a bidirectional resonant DC-DC conversion circuit according to an embodiment of the present disclosure. The bidirectional resonant DC-DC conversion circuit may include a full-bridge conversion module 11, a transformer 12, and a half-bridge conversion module 13. The full-bridge conversion module 11 is coupled to the half-bridge conversion module 13 via the transformer 12.

The full-bridge conversion module 11 is configured to convert two-level direct current power into alternating current power, and the half-bridge conversion module 13 is configured to convert the alternating current power outputted by the full-bridge conversion module 11 into three-level direct current power.

The half-bridge conversion module 13 is further configured to convert three-level direct current power into alternating current power, and the full-bridge conversion module 11 is further configured to convert the alternating current power outputted by the half-bridge conversion module 13 into two-level direct current power.

In this way, the mutual conversion between the two-level and the three-level can be achieved. Further, since the half-bridge topology is used on one side, fewer switching devices are used, and space and hardware costs can be saved, which is in line with miniaturization of a switching power supply.

In an implementation of this embodiment, a secondary winding of the transformer 12 is a single winding, to further reduce the space occupied by the transformer 12 and reduce the device cost.

Figure 2:
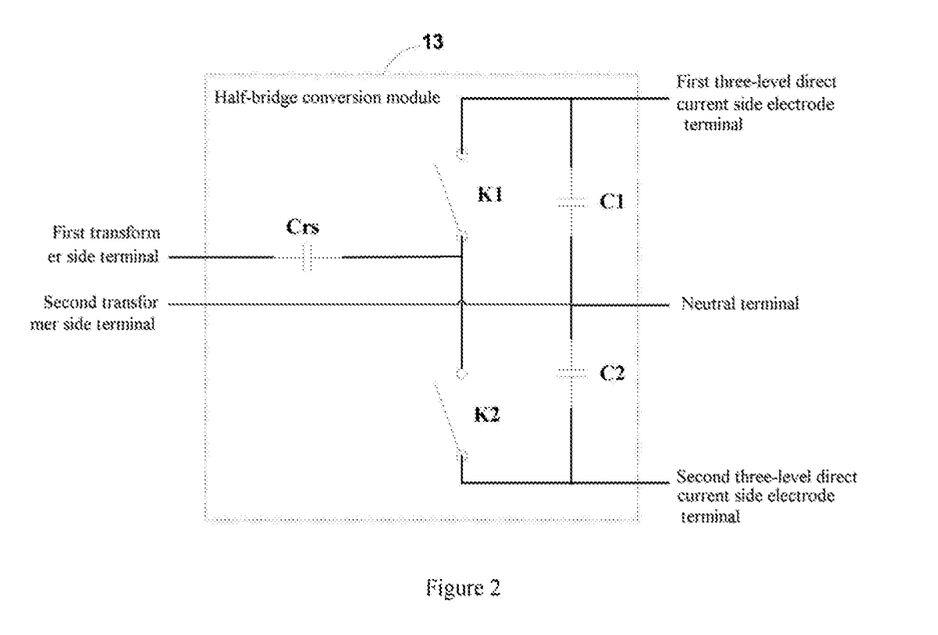
FIG. 2 is a schematic diagram showing a topology structure of a half-bridge conversion module according to an embodiment of the present disclosure.

In an implementation of this embodiment, as shown in FIG. 2, the half-bridge conversion module 13 may include a first switch K1, a second switch K2, a first bus capacitor C1, a second bus capacitor C2, and a first resonant capacitor Crs.

The first switch K1 and the second switch K2 are connected in series with each other to form a first branch. The first bus capacitor C1 and the second bus capacitor C2 are connected in series with each other to form a second branch. The first branch and the second branch are connected in parallel with each other to form a third branch. One terminal of the third branch is a first electrode terminal of a three-level direct current side, and the other terminal of the third branch is a second electrode terminal of the three-level direct current side.

A connection point between the first switch K1 and the second switch K2 is connected to one terminal of the first resonant capacitor Crs, and the other terminal of the first resonant capacitor Crs is a first transformer side terminal of the half-bridge conversion module 13.

A connection point between the first bus capacitor C1 and the second bus capacitor C2 is a three-level direct current side neutral terminal and a second transformer side terminal of the half-bridge conversion module 13.

It should be noted that, the first electrode may be a positive electrode or a negative electrode, and the second electrode may be a negative electrode or a positive electrode. The first transformer side terminal may be a dotted terminal or a non-dotted terminal of the secondary winding of the transformer 12, and the second transformer side terminal may be a non-dotted terminal or a dotted terminal of the secondary winding of the transformer 12. For example, one terminal of the third branch is a three-level direct current side positive terminal, the other terminal of the third branch is a three-level direct current side negative terminal, one terminal of the first resonant capacitor is connected to a non-dotted terminal of the secondary winding of the transformer 12, and the connection point between C1 and C2 is the three-level direct current side neutral terminal and a dotted terminal of the secondary winding of the transformer 12, which is not limited herein.

That is, on the double bus side (three-level direct current side) of the bidirectional resonant DC-DC conversion circuit, with a resonant capacitor, two switching devices, and a set equivalent inductance, half-bridge LLC resonance can be performed during a process that a power flow is transmitted from the three-level direct current side to the two-level direct current side, and half-bridge rectification can be performed during a process that the power flow is transmitted from the two-level direct current side to the three-level direct current side. Further, no inductance device needs to be connected in series between the transformer 12 and the half-bridge conversion module 13, which further saves the space and device costs. It should be noted that the set equivalent inductance herein may include, but is not limited to, a leakage inductance of the transformer 12, and an equivalent inductance transmitted by an inductance device on the single direct current side (two-level direct current side) of the bidirectional resonant DC-DC conversion circuit to the double bus side, which is not limited herein.

Figure 3:
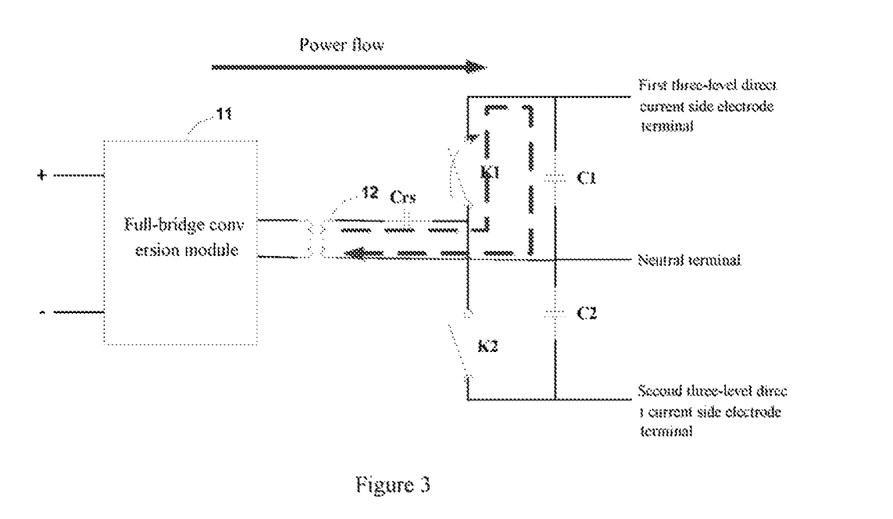
FIG. 3 is a schematic diagram showing an operating principle of a half-bridge conversion module according to an embodiment of the present disclosure.
Figure 4:
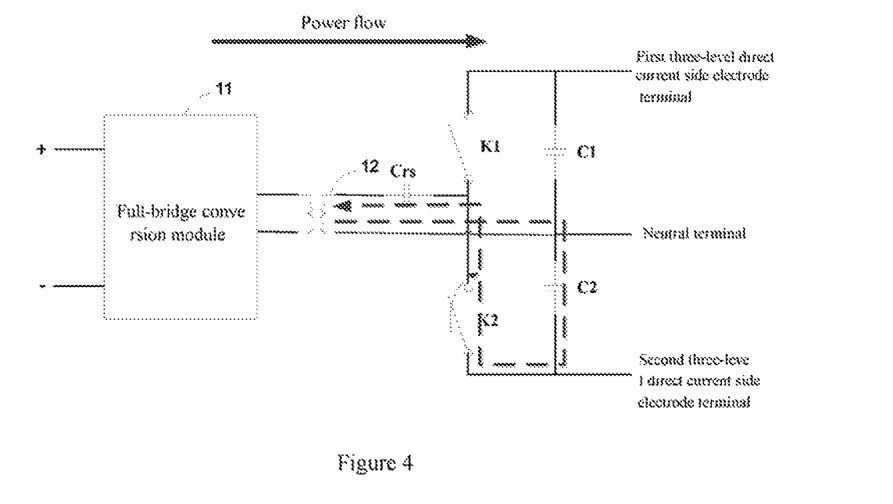
FIG. 4 is a schematic diagram showing another operating principle of a half-bridge conversion module according to an embodiment of the present disclosure.

In a first phase of the process that a power flow is transmitted from the two-level direct current side to the three-level direct current side, as shown in FIG. 3, K1 is turned on, and K2 is turned off, so that a first terminal of the second winding of the transformer 12, Crs, K1, C1, and a second terminal of the secondary winding of the transformer 12 form a freewheeling loop, and C1 is charged. In a second phase of the process that the power flow is transmitted from the two-level direct current side to the three-level direct current side, as shown in FIG. 4, K1 is turned off, and K2 is turned on, so that the second terminal of the secondary winding of the transformer 12, C2, K2, Crs and the first terminal of the secondary winding of the transformer 12 form a freewheeling loop, and C2 is charged. The first phase and the second phase are cyclically performed to alternately charge C1 and C2, so as to convert alternating current power outputted by the full-bridge conversion module 11 into three-level direct current power.

It should be noted that a ratio of a duration of the first phase to a duration of the second phase of the process that the power flow is transmitted from the two-level direct current side to the three-level direct current side may be flexibly set. Specifically, the ratio may be flexibly changed based on voltages of C1 and C2. For example, in a case that the voltage of C1 is greater than the voltage of C2, the duration of the first phase may be set to be less than the duration of the second phase. Alternatively, in the case that the voltage of C1 is greater than the voltage of C2, the duration of the first phase may be decreased by a set step size, and the duration of the second phase may be increased by the set step size, which is not described in detail herein.

Figure 5:
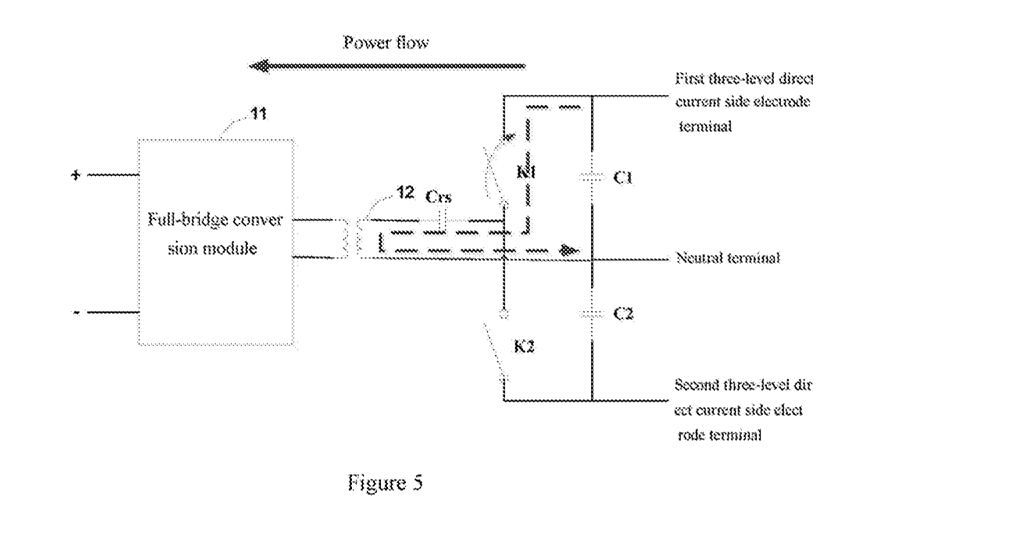
FIG. 5 is a schematic diagram showing another operating principle of a half-bridge conversion module according to an embodiment of the present disclosure.
Figure 6:
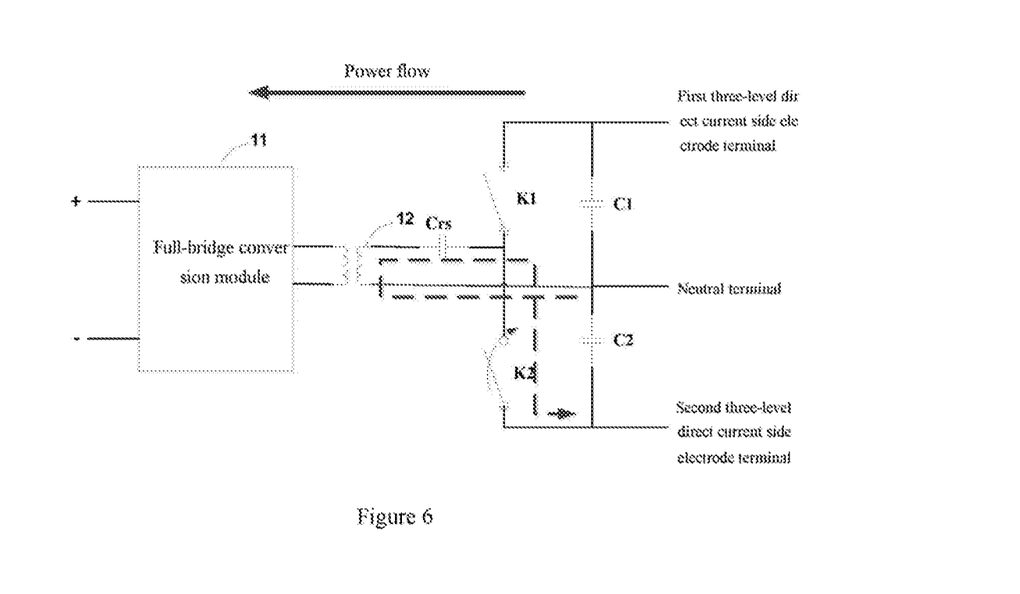
FIG. 6 is a schematic diagram showing another operating principle of a half-bridge conversion module according to an embodiment of the present disclosure.

In a first phase of the process that the power flow is transmitted from the three-level direct current side to the two-level direct current side, as shown in FIG. 5, K1 is turned on, and K2 is turned off, so that K1, Crs, and the secondary winding of the transformer 12 forms a resonance loop, and C1 is discharged. In a second phase of the process that the power flow is transmitted from the three-level direct current side to the two-level direct current side, as shown in FIG. 6, K1 is turned off, and K2 is turned on, so that the secondary winding of the transformer 12, Crs and K2 form a resonance loop, and C2 is discharged.

It should be noted that a ratio of a duration of the first phase to a duration of the second phase of the process that the power flow is transmitted from the three-level direct current side to the two-level direct current side may be flexibly set. Preferably, the duration of the first phase may be equal to the duration of the second phase, which is not limited herein.

Figure 7:
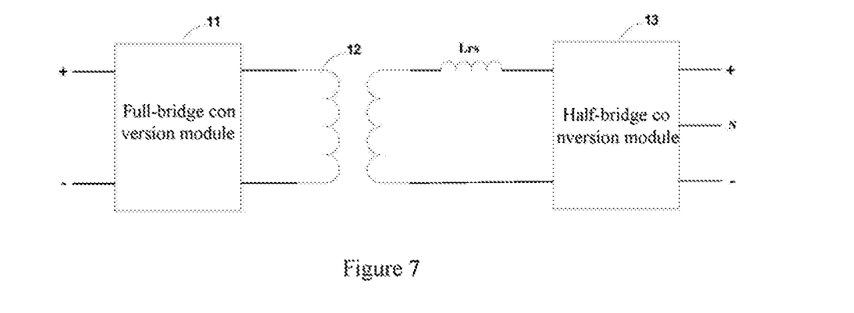
FIG. 7 is a schematic diagram showing another structure of a bidirectional resonant DC-DC conversion circuit according to an embodiment of the present disclosure.

In another implementation of this embodiment, as shown in FIG. 7, the bidirectional resonant DC-DC conversion circuit may further include a first resonant inductor Lrs. Lrs and the secondary winding of the transformer 12 are connected in series with each other to form a fourth branch. That is, an inductive device may be connected in series between the transformer 12 and the half-bridge conversion module 13 to perform the half-bridge LLC resonance during the process that the power flow is transmitted from the three-level direct current side to the two-level direct current side.

Figure 8:
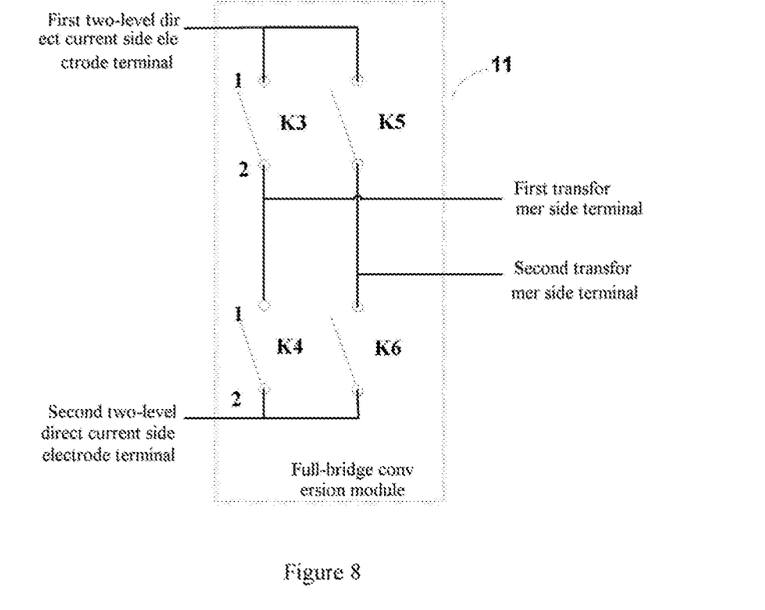
FIG. 8 is a schematic diagram showing a topology structure of a full-bridge conversion module according to an embodiment of the present disclosure.

In an implementation of this embodiment, as shown in FIG. 8, the full-bridge conversion module 11 may include a third switch K3, a fourth switch K4, a fifth switch K5, and a sixth switch K6.

K3 and K4 are connected in series with each other to form a fifth branch. K5 and K6 are connected in series with each other to form a sixth branch. The fifth branch and the sixth branch are connected in parallel with each other to form a seventh branch. One terminal of the seventh branch is a first two-level direct current side electrode terminal, and the other terminal of the seventh branch is a second two-level direct current side electrode terminal.

A connection point between K3 and K4 is a first transformer side terminal of the full-bridge conversion module 11, and a connection point between K5 and K6 is a second transformer side terminal of the full-bridge conversion module 11.

It should be noted that, the first electrode may be a positive electrode or a negative electrode, and the second electrode may be a negative electrode or a positive electrode. The first transformer side terminal of the full-bridge conversion module 11 may be a dotted terminal or a non-dotted terminal of a primary winding of the transformer 12, and the second transformer side terminal of the full-bridge conversion module 11 may be a non-dotted terminal or a dotted terminal of the primary winding of the transformer 12. For example, one terminal of the seventh branch is a two-level direct current side positive terminal, the other terminal of the seventh branch is a two-level direct current side negative terminal, the connection point between K3 and K4 is connected to a dotted terminal of the primary winding of the transformer 12, and the connection point between K5 and K6 is connected to a non-dotted terminal of the primary winding of transformer 12, which is not limited herein.

That is, on the single direct current side (two-level direct current side) of the bidirectional resonant DC-DC conversion circuit, with the on and off states of the four switching devices and a set equivalent capacitance, full-bridge LLC resonance can be performed during the process that the power flow is transmitted from the two-level direct current side to the three-level direct current side, and full-bridge rectification can be performed during the process that the power flow is transmitted from the three-level direct current side to the two-level direct current side. Further, no capacitance or inductive device needs to be connected between the full-bridge conversion module 11 and the transformer 12, which further saves the space and device costs. It should be noted that the set equivalent capacitance herein may include, but is not limited to, an equivalent capacitance transmitted by a capacitive device on the double bus side (three-level direct current side) of the bidirectional resonant DC-DC conversion circuit to the single direct current side, which is not limited herein.

Figure 9:
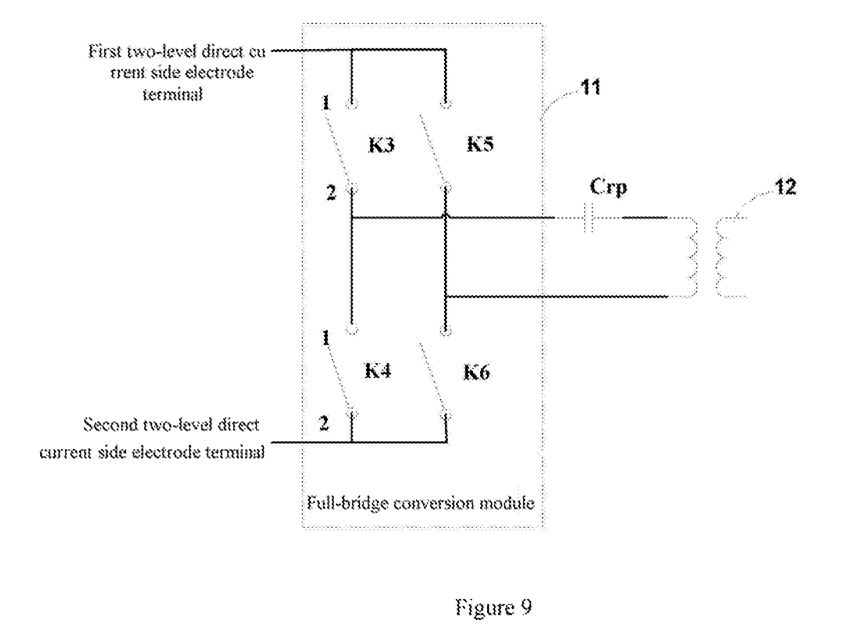
FIG. 9 is a schematic diagram showing another structure of a bidirectional resonant DC-DC conversion circuit according to an embodiment of the present disclosure.

In an implementation of this embodiment, as shown in FIG. 9, the bidirectional resonant DC-DC conversion circuit may further include a second resonant capacitor Crp. Crp and the primary winding of the transformer 12 are connected in series with each other to form an eighth branch. The eighth branch is connected between the first transformer side terminal and the second transformer side terminal of the full-bridge conversion module 11.

That is, on the single direct current side of the bidirectional resonant DC-DC conversion circuit, with four switching devices, Crp, and a set equivalent inductance, the full-bridge LLC resonance can also be performed during the process that the power flow is transmitted from the two-level direct current side to the three-level direct current side, and the full-bridge rectification can also be performed during the process that the power flow is transmitted from the three-level direct current side to the two-level direct current side. In this way, no inductive device needs to be connected between the full-bridge conversion module 11 and the transformer 12, which further saves the space and device costs.

It should be noted that the set equivalent inductance herein may include, but is not limited to, a leakage inductance of the transformer 12, and an equivalent inductance transmitted by an inductance device on the double bus side of the bidirectional resonant DC-DC conversion circuit to the single direct current side, which is not limited herein.

Figure 10:
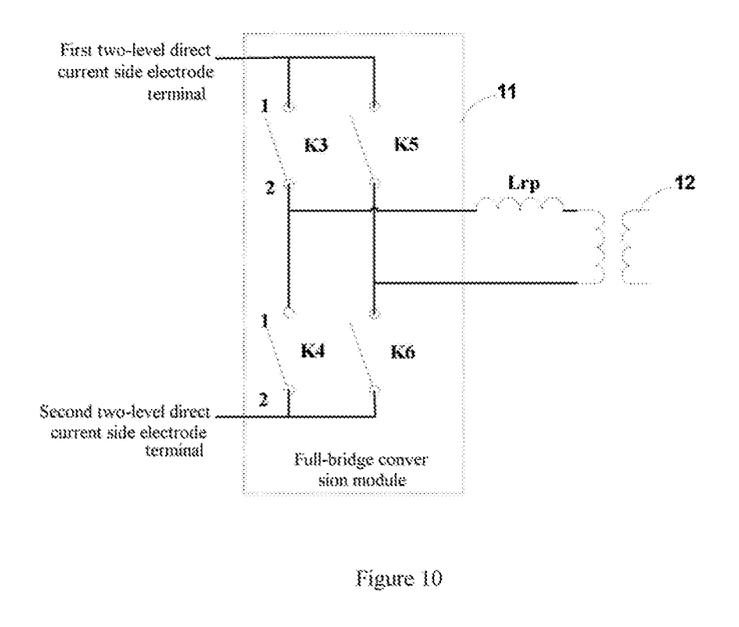
FIG. 10 is a schematic diagram showing another structure of a bidirectional resonant DC-DC conversion circuit according to an embodiment of the present disclosure.

In another implementation of this embodiment, as shown in FIG. 10, the bidirectional resonant DC-DC conversion circuit may further include a second resonant inductor Lrp. Lrp and the primary winding of the transformer 12 are connected in series with each other to form an eighth branch. The eighth branch is connected between the first transformer side terminal and the second transformer side terminal of the full-bridge conversion module 11.

Figure 11:
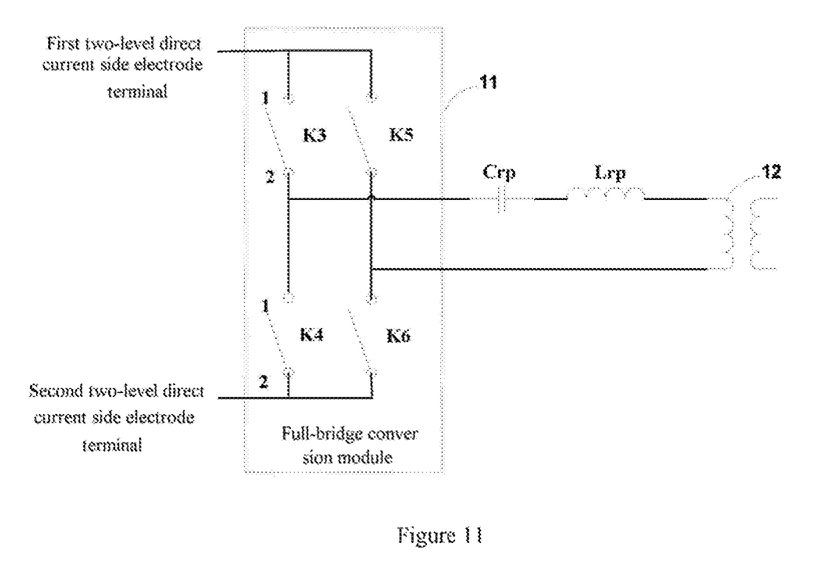
FIG. 11 is a schematic diagram showing another structure of a bidirectional resonant DC-DC conversion circuit according to an embodiment of the present disclosure.

In another implementation of this embodiment, as shown in FIG. 11, the bidirectional resonant DC-DC conversion circuit may further include a second resonant capacitor Crp and a second resonant inductor Lrp. Crp, Lrp, and the primary winding of the transformer 12 are connected in series with each other to form an eighth branch. The eighth branch is connected between the first transformer side terminal and the second transformer side terminal of the full-bridge conversion module 11.

Figure 12:
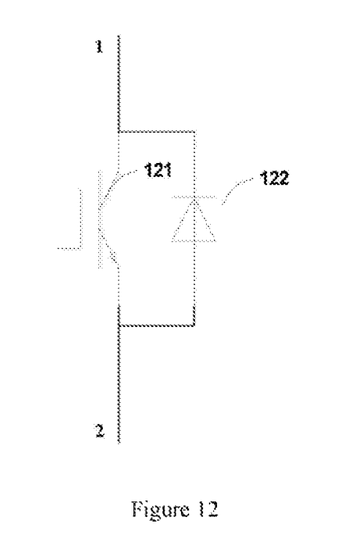
FIG. 12 is a schematic diagram showing a structure of any switch according to an embodiment of the present disclosure.

Preferably, in an implementation of this embodiment, as shown in FIG. 12, each of the switches may include a switch tube 121 and a diode 122. An input terminal of the switch tube 121 is connected to a cathode of the diode 122, and an output terminal of the switch tube 121 is connected to an anode of diode 122.

The switch tube 121 in this embodiment may be an insulated gate bipolar transistor (IGBT), a triode, or a metal-oxide-semiconductor field-effect transistor (MOSFET), which is not limited herein.

It should be noted that, in a case that the switch tube 121 in each of K3, K4, K5, and K6 is an IGBT or a triode, the full-bridge conversion module 11 may perform the full-bridge rectification during the process that the power flow is transmitted from the three-level direct current side to the two-level direct current side. In a case that the switching transistor 121 in each of K3, K4, K5, and K6 is a MOSFET, the full-bridge conversion module 11 may perform synchronous rectification during the process that the power flow is transmitted from the three-level direct current side to the two-level direct current side.

In an implementation of this embodiment, the diode 122 in any one switch may be a fast recovery diode. Since a reverse recovery current of the fast recovery diode is small, a withstand voltage of the switch is higher as compared with a switch having a conventional diode.

It should be noted that the bidirectional resonant DC-DC conversion circuit according to this embodiment may be implemented in combination with the embodiments described above. The bidirectional resonant DC-DC conversion circuit is described in detail below by different examples.

First Example

Figure 13:
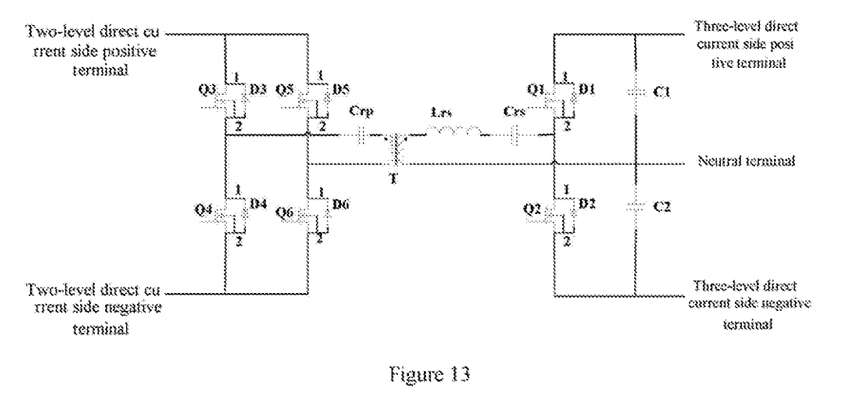
FIG. 13 is a schematic diagram showing a circuit structure of a bidirectional resonant DC-DC conversion circuit according to a first example of the present disclosure.

A topology structure of the bidirectional resonant DC-DC conversion circuit is shown in FIG. 13. A first terminal of the first switch K1 (including Q1 and D1) is connected to one terminal of the first bus capacitor C1 at the three-level direct current side positive terminal. A second terminal of K1, a first terminal of the second switch K2 (including Q2 and D2), and one terminal of the first resonant capacitor Crs are connected with each other. The other terminal of Crs is connected to one terminal of the first resonant inductor Lrs. The other terminal of Lrs is connected to the dotted terminal of the secondary winding of the transformer T. A second terminal of K2 is connected to one terminal of the second bus capacitor C2 at the three-level direct current side negative terminal. The other terminal of C1 is connected to the other terminal of C2, and the connection point between the other terminal of C1 and the other terminal of C2 is connected to the non-dotted terminal of the secondary winding of T and serves as the three-level direct current side neutral terminal.

A first terminal of the third switch K3 (including Q3 and D3) is connected to a first terminal of the fifth switch K5 (including Q5 and D5) at the two-level direct current side positive terminal. A second terminal of K3, a first terminal of the fourth switch K4 (including Q4 and D4), and one terminal of the second resonant capacitor Crp are connected with each other. The other terminal of Crp is connected to the dotted terminal of the primary winding of T. A second terminal of K5, a first terminal of the sixth switch K6 (including Q6 and D6), and the non-dotted terminal of the primary winding of T are connected with each other. A second terminal of K4 is connected to a second terminal of K6 at the two-level direct current side negative terminal.

Each of the switches includes a MOS transistor Q and a diode D. A drain of the MOS transistor is connected to a cathode of the diode at a first terminal of the switch, a source of the MOS transistor is connected to an anode of the diode at a second terminal of the switch, and a gate of the MOS transistor is a control terminal for the switch.

The bidirectional resonant DC-DC conversion circuit shown in FIG. 13 operates as follows.

In the first phase of the process that the power flow is transmitted from the two-level direct current side to the three-level direct current side, Q3 and Q6 are turned on, and Q4 and Q5 are turned off, so that the two-level direct current side positive terminal, Q3, Crp, the dotted terminal of the primary winding of T, the non-dotted terminal of the primary winding of T, Q6 and the two-level direct current side negative terminal form a resonance loop. Further, Q1 and Q2 are turned off, so that the dotted terminal of the secondary winding of T, Lrs, Crs, D1, C1 and the non-dotted terminal of the secondary winding of T (the neutral terminal) form a freewheeling loop, and C1 is charged. In the second phase of the process that the power flow is transmitted from the two-level direct current side to the three-level direct current side, Q4 and Q5 are turned on, and Q3 and Q6 are turned off, so that the two-level direct current side positive terminal, Q5, the non-dotted terminal of the primary winding of T, the dotted terminal of the primary winding of T, Crp, Q4 and the two-level direct current side negative terminal form a resonance loop. Further, Q1 and Q2 are turned off, so that the non-dotted terminal of the secondary winding of T (the neutral terminal), C2, D2, Crs, Lrs and the dotted terminal of the secondary winding of T form a freewheeling loop, and C2 is charged.

In the first phase of the process that the power flow is transmitted from the three-level direct current side to the two-level direct current side, Q1 is turned on, and Q2 is turned off, so that the three-level direct current side positive terminal, Q1, Crs, Lrs, the dotted terminal of the secondary winding of T, and the non-dotted terminal of the secondary winding of T (the neutral terminal) form a resonance loop, and C1 is discharged. Further, Q3, Q4, Q5 and Q6 are turned off, so that the dotted terminal of the primary winding of T, Crp, D3, the two-level direct current side positive terminal, the two-level direct current side negative terminal, D6 and the non-dotted terminal of the primary winding of T form a freewheeling loop, and the single bus is charged. In the second phase of the process that the power flow is transmitted from the three-level direct current side to the two-level direct current side, Q2 is turned on, and Q1 is turned off, so that the neutral terminal (the non-dotted terminal of the secondary winding of T), Lrs, Crs, Q2 and the three-level direct current side negative terminal form a resonance loop, and C2 is discharged. Further, Q3, Q4, Q5 and Q6 are turned off, so that the non-dotted terminal of the primary winding of T, D5, the two-level direct current side positive terminal, the two-level direct current side negative terminal, D4, Crp and the dotted terminal of the primary winding of T form a freewheeling loop, and the single bus is charged.

Second Example

Figure 14:
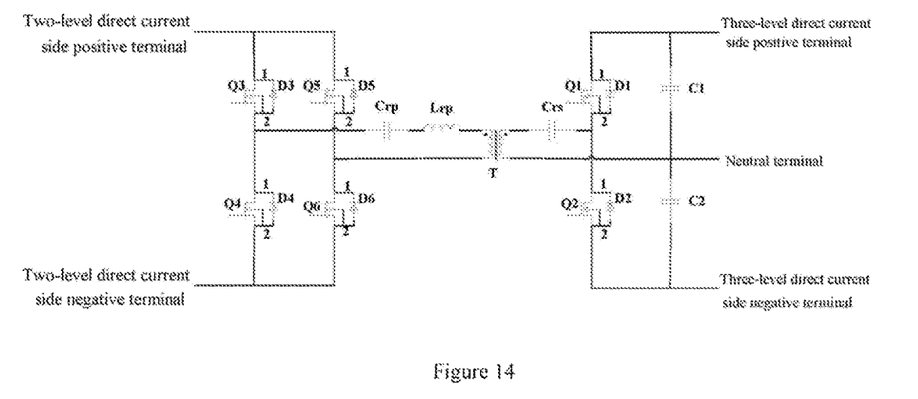
FIG. 14 is a schematic diagram showing a circuit structure of a bidirectional resonant DC-DC conversion circuit according to a second example of the present disclosure.

Another topology structure of the bidirectional resonant DC-DC conversion circuit is shown in FIG. 14. A first terminal of the first switch K1 (including Q1 and D1) is connected to one terminal of the first bus capacitor C1 at the three-level direct current side positive terminal. A second terminal of K1, a first terminal of the second switch K2 (including Q2 and D2), and one terminal of the first resonant capacitor Crs are connected with each other. The other terminal of Crs is connected to the dotted terminal of the secondary winding of the transformer T. A second terminal of K2 is connected to one terminal of the second bus capacitor C2 at the three-level direct current side negative terminal. The other terminal of C1 is connected to the other terminal of C2, and the connection point between the other terminal of C1 and the other terminal of C2 is connected to the non-dotted terminal of the secondary winding of T and serves as the three-level direct current side neutral terminal.

A first terminal of the third switch K3 (including Q3 and D3) is connected to a first terminal of the fifth switch K5 (including Q5 and D5) at the two-level direct current side positive terminal. A second terminal of K3, a first terminal of the fourth switch K4 (including Q4 and D4), and one terminal of the second resonant capacitor Crp are connected with each other. The other terminal of Crp is connected to one terminal of the second resonant inductor Lrp. The other terminal of Lrp is connected to the dotted terminal of the primary winding of T. A second terminal of K5, a first terminal of the sixth switch K6 (including Q6 and D6), and the non-dotted terminal of the primary winding of T are connected with each other. A second terminal of K4 is connected to a second terminal of K6 at the two-level direct current side negative terminal.

Each of the switches includes a MOS transistor Q and a diode D. A drain of the MOS transistor is connected to a cathode of the diode at a first terminal of the switch, a source of the MOS transistor is connected to an anode of the diode at a second terminal of the switch, and a gate of the MOS transistor is a control terminal for the switch.

The bidirectional resonant DC-DC conversion circuit shown in FIG. 14 operates as follows.

In the first phase of the process that the power flow is transmitted from the two-level direct current side to the three-level direct current side, Q3 and Q6 are turned on, and Q4 and Q5 are turned off, so that the two-level direct current side positive terminal, Q3, Crp, Lrp, the dotted terminal of the primary winding of T, the non-dotted terminal of the primary winding of T, Q6 and the two-level direct current side negative terminal form a resonance loop. Further, Q1 and Q2 are turned off, so that the dotted terminal of the secondary winding of T, Crs, D1, C1 and the non-dotted terminal of the secondary winding of T (the neutral terminal) form a freewheeling loop, and C1 is charged. In the second phase of the process that the power flow is transmitted from the two-level direct current side to the three-level direct current side, Q4 and Q5 are turned on, and Q3 and Q6 are turned off, so that the two-level direct current side positive terminal, Q5, the non-dotted terminal of the primary winding of T, the dotted terminal of the primary winding of T, Lrp, Crp, Q4 and the two-level direct current side negative terminal form a resonance loop. Further, Q1 and Q2 are turned off, so that the non-dotted terminal of the secondary winding of T (the neutral terminal), C2, D2, Crs and the dotted terminal of the secondary winding of T form a freewheeling loop, and C2 is charged.

In the first phase of the process that the power flow is transmitted from the three-level direct current side to the two-level direct current side, Q1 is turned on, and Q2 is turned off, so that the three-level direct current side positive terminal, Q1, Crs, and the equivalent inductance transmitted by Lrp to the three-level direct current side, the dotted terminal of the secondary winding of T, and the non-dotted terminal of the secondary winding of T (the neutral terminal) form a resonance loop, and C1 is discharged. Further, Q3, Q4, Q5 and Q6 are turned off, so that the dotted terminal of the primary winding of T, Lrp, Crp, D3, the two-level direct current side positive terminal, the two-level direct current side negative terminal, D6 and the non-dotted terminal of the primary winding of T form a freewheeling loop, and the single bus is charged. In the second phase of the process that the power flow is transmitted from the three-level direct current side to the two-level direct current side, Q2 is turned on, and Q1 is turned off, so that the neutral terminal (the non-dotted terminal of the secondary winding of T), the equivalent inductance transmitted by Lrp to the three-level direct current side, Crs, Q2 and the three-level direct current side negative terminal form a resonance loop, and C2 is discharged. Further, Q3, Q4, Q5 and Q6 are turned off, so that the non-dotted terminal of the primary winding of T, D5, the two-level direct current side positive terminal, the two-level direct current side negative terminal, D4, Crp, Lrp and the dotted terminal of the primary winding of T form a freewheeling loop, and the single bus is charged.

Third Example

Figure 15:
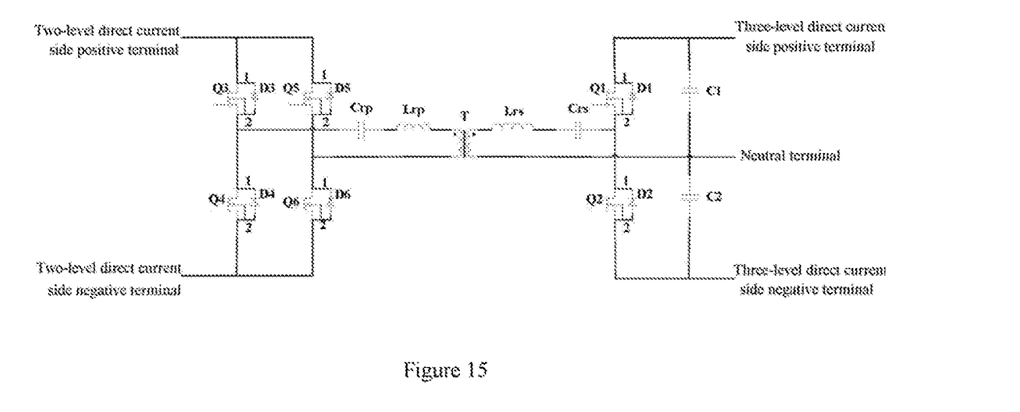
FIG. 15 is a schematic diagram showing a circuit structure of a bidirectional resonant DC-DC conversion circuit according to a third example of the present disclosure.

Another topology structure of the bidirectional resonant DC-DC conversion circuit is shown in FIG. 15. A first terminal of the first switch K1 (including Q1 and D1) is connected to one terminal of the first bus capacitor C1 at the three-level direct current side positive terminal. A second terminal of K1, a first terminal of the second switch K2 (including Q2 and D2), and one terminal of the first resonant capacitor Crs are connected with each other. The other terminal of Crs is connected to one terminal of the first resonant inductor Lrs. The other terminal of Lrs is connected to the dotted terminal of the secondary winding of the transformer T. A second terminal of K2 is connected to one terminal of the second bus capacitor C2 at the three-level direct current side negative terminal. The other terminal of C1 is connected to the other terminal of C2, and the connection point between the other terminal of C1 and the other terminal of C2 is connected to the non-dotted terminal of the secondary winding of T and serves as the three-level direct current side neutral terminal.

A first terminal of the third switch K3 (including Q3 and D3) is connected to a first terminal of the fifth switch K5 (including Q5 and D5) at the two-level direct current side positive terminal. A second terminal of K3, a first terminal of the fourth switch K4 (including Q4 and D4), and one terminal of the second resonant capacitor Crp are connected with each other. The other terminal of Crp is connected to one terminal of the second resonant inductor Lrp. The other terminal of Lrp is connected to the dotted terminal of the primary winding of T. A second terminal of K5, a first terminal of the sixth switch K6 (including Q6 and D6), and the non-dotted terminal of the primary winding of T are connected with each other. A second terminal of K4 is connected to a second terminal of K6 at the two-level direct current side negative terminal.

Each of the switches includes a MOS transistor Q and a diode D. A drain of the MOS transistor is connected to a cathode of the diode at a first terminal of the switch, a source of the MOS transistor is connected to an anode of the diode at a second terminal of the switch, and a gate of the MOS transistor is a control terminal for the switch.

In the bidirectional resonant DC-DC conversion circuit shown in FIG. 15, during the process that the power flow is transmitted from the three-level direct current side to the two-level direct current side, Lrs directly participates in the LLC resonance, and the operating principle of the bidirectional resonant DC-DC conversion circuit shown in FIG. 15 operates under a principle similar to that of the bidirectional resonant DC-DC conversion circuit shown in FIG. 14, which is not repeated herein.

Based on above, a UPS is further provided according to an embodiment of the present disclosure. The UPS may include the bidirectional resonant DC-DC conversion circuit described above.

In summary, a bidirectional resonant DC-DC conversion circuit and a UPS including the conversion circuit are provided according to the embodiments of the present disclosure. The bidirectional resonant DC-DC conversion circuit includes a full-bridge conversion module, a transformer, and a half-bridge conversion module. The full-bridge conversion module is coupled to the half-bridge conversion module via the transformer. The full-bridge conversion module is configured to convert two-level direct current power into alternating current power, and the half-bridge conversion module is configured to convert the alternating current power outputted by the full-bridge conversion module into three-level direct current power. The half-bridge conversion module is further configured to convert three-level direct current power into alternating current power, and the full-bridge conversion module is further configured to convert the alternating current power outputted by the half-bridge conversion module into two-level direct current power. In this way, the mutual conversion between the two-level and the three-level can be achieved. Further, since the half-bridge topology is used on one side, fewer switching devices are used, and space and hardware costs can be saved, which is in line with miniaturization of a switching power supply.

It should be noted that the number of elements in the drawings and the description is only illustrative but not limitative, and names are only used to distinguish one element from another without any limitation.

Although the preferred embodiments of the present disclosure are described, those skilled in the art may make additional changes and modifications to the embodiments once they know the basic inventive concepts. Therefore, the appended claims are intended to be explained as including the preferred embodiments and all changes and modifications falling within the scope of the present disclosure.

It is apparent that those skilled in the art may make various modifications and variations to the present disclosure without departing from the spirit and scope of the present disclosure. If the modifications and variations fall into the scope of the claims of the present disclosure and equivalents thereof, the present disclosure encompasses the modifications and variations.

The invention claimed is:

1. A bidirectional resonant direct current-direct current conversion circuit, comprising:
    a full-bridge conversion module;
    a transformer; and
    a half-bridge conversion module, wherein
    the full-bridge conversion module is coupled to the half-bridge conversion module via the transformer;
    the full-bridge conversion module is configured to convert two-level direct current power into alternating current power, and the half-bridge conversion module is configured to convert the alternating current power outputted by the full-bridge conversion module into three-level direct current power; and
    the half-bridge conversion module is further configured to convert three-level direct current power into alternating current power, and the full-bridge conversion module is further configured to convert the alternating current power outputted by the half-bridge conversion module into two-level direct current power.

2. The bidirectional resonant direct current-direct current conversion circuit according to claim 1, wherein the half-bridge conversion module comprises:
    a first switch;
    a second switch;
    a first bus capacitor;
    a second bus capacitor; and
    a first resonant capacitor, wherein
    the first switch and the second switch are connected in series with each other to form a first branch;
    the first bus capacitor and the second bus capacitor are connected in series with each other to form a second branch;
    the first branch and the second branch are connected in parallel with each other to form a third branch, one terminal of the third branch is a first three-level direct current side electrode terminal, and the other terminal of the third branch is a second three-level direct current side electrode terminal;
    a connection point between the first switch and the second switch is connected to one terminal of the first resonant capacitor, and the other terminal of the first resonant capacitor is a first transformer side terminal of the half-bridge conversion module; and
    a connection point between the first bus capacitor and the second bus capacitor is a three-level direct current side neutral terminal and a second transformer side terminal of the half-bridge conversion module.

3. The bidirectional resonant direct current-direct current conversion circuit according to claim 2, wherein
    in a first phase of a process that a power flow is transmitted from two-level direct current side to the three-level direct current side, the first switch is turned on, and the second switch is turned off, wherein a first terminal of a secondary winding of the transformer, the first resonant capacitor, the first switch, the first bus capacitor, and a second terminal of the secondary winding of the transformer form a freewheeling loop, and the first bus capacitor is charged;

in a second phase of the process that the power flow is transmitted from the two-level direct current side to the three-level direct current side, the first switch is turned off, and the second switch is turned on, wherein the second terminal of the secondary winding of the transformer, the second bus capacitor, the second switch, the first resonant capacitor, and the first terminal of the secondary winding of the transformer form a freewheeling loop, and the second bus capacitor is charged;

in a first phase of a process that the power flow is transmitted from the three-level direct current side to the two-level direct current side, the first switch is turned on, and the second switch is turned off, wherein the first switch, the first resonant capacitor, and the secondary winding of the transformer form a resonance loop, and the first bus capacitor is discharged; and in a second phase of the process that the power flow is transmitted from the three-level direct current side to the two-level direct current side, the first switch is turned off, and the second switch is turned on, wherein the secondary winding of the transformer, the first resonant capacitor, and the second switch form a resonance loop, and the second bus capacitor is discharged.

4. The bidirectional resonant direct current-direct current conversion circuit according to claim 2, further comprising:
a first resonant inductor, wherein the first resonant inductor and the secondary winding of the transformer are connected in series with each other to form a four branch.

5. The bidirectional resonant direct current-direct current conversion circuit according to claim 2, wherein the full-bridge conversion module comprises:
a third switch;
a fourth switch;
a fifth switch; and
a sixth switch, wherein
the third switch and the fourth switch are connected in series with each other to form a fifth branch;
the fifth switch and the sixth switch are connected in series with each other to form a sixth branch;
the fifth branch and the sixth branch are connected in parallel with each other to form a seventh branch, one terminal of the seventh branch is a first two-level direct current side electrode terminal, and the other terminal of the seventh branch is a second two-level direct current side electrode terminal; and
a connection point between the third switch and the fourth switch is a first transformer side terminal of the full-bridge conversion module, and a connection point between the fifth switch and the sixth switch is a second transformer side terminal of the full-bridge conversion module.

6. The bidirectional resonant direct current-direct current conversion circuit according to claim 3, wherein the full-bridge conversion module comprises:
a third switch;
a fourth switch;
a fifth switch; and
a sixth switch, wherein
the third switch and the fourth switch are connected in series with each other to form a fifth branch;
the fifth switch and the sixth switch are connected in series with each other to form a sixth branch;
the fifth branch and the sixth branch are connected in parallel with each other to form a seventh branch, one terminal of the seventh branch is a first two-level direct current side electrode terminal, and the other terminal of the seventh branch is a second two-level direct current side electrode terminal; and
a connection point between the third switch and the fourth switch is a first transformer side terminal of the full-bridge conversion module, and a connection point between the fifth switch and the sixth switch is a second transformer side terminal of the full-bridge conversion module.

7. The bidirectional resonant direct current-direct current conversion circuit according to claim 4, wherein the full-bridge conversion module comprises:
a third switch;
a fourth switch;
a fifth switch; and
a sixth switch, wherein
the third switch and the fourth switch are connected in series with each other to form a fifth branch;
the fifth switch and the sixth switch are connected in series with each other to form a sixth branch;
the fifth branch and the sixth branch are connected in parallel with each other to form a seventh branch, one terminal of the seventh branch is a first two-level direct current side electrode terminal, and the other terminal of the seventh branch is a second two-level direct current side electrode terminal; and
a connection point between the third switch and the fourth switch is a first transformer side terminal of the full-bridge conversion module, and a connection point between the fifth switch and the sixth switch is a second transformer side terminal of the full-bridge conversion module.

8. The bidirectional resonant direct current-direct current conversion circuit according to claim 5, further comprising:
a second resonant capacitor, wherein the second resonant capacitor and a primary winding of the transformer are connected in series with each other to form an eighth branch, and the eighth branch is connected between the first transformer side terminal and the second transformer side terminal of the full-bridge conversion module.

9. The bidirectional resonant direct current-direct current conversion circuit according to claim 6, further comprising:
a second resonant capacitor, wherein the second resonant capacitor and a primary winding of the transformer are connected in series with each other to form an eighth branch, and the eighth branch is connected between the first transformer side terminal and the second transformer side terminal of the full-bridge conversion module.

10. The bidirectional resonant direct current-direct current conversion circuit according to claim 7, further comprising:
a second resonant capacitor, wherein the second resonant capacitor and a primary winding of the transformer are connected in series with each other to form an eighth branch, and the eighth branch is connected between the first transformer side terminal and the second transformer side terminal of the full-bridge conversion module.

11. The bidirectional resonant direct current-direct current conversion circuit according to claim 5, further comprising:
a second resonant inductor, wherein the second resonant inductor and a primary winding of the transformer are connected in series with each other to form an eighth branch, and the eighth branch is connected between the first transformer side terminal and the second transformer side terminal of the full-bridge conversion module.

12. The bidirectional resonant direct current-direct current conversion circuit according to claim 6, further comprising:
a second resonant inductor, wherein the second resonant inductor and a primary winding of the transformer are connected in series with each other to form an eighth branch, and the eighth branch is connected between the first transformer side terminal and the second transformer side terminal of the full-bridge conversion module.

13. The bidirectional resonant direct current-direct current conversion circuit according to claim 7, further comprising:
a second resonant inductor, wherein the second resonant inductor and a primary winding of the transformer are connected in series with each other to form an eighth branch, and the eighth branch is connected between the first transformer side terminal and the second transformer side terminal of the full-bridge conversion module.

14. The bidirectional resonant direct current-direct current conversion circuit according to claim 5, further comprising:
a second resonant capacitor and a second resonant inductor, wherein the second resonant capacitor, the second resonant inductor, and a primary winding of the transformer are connected in series with each other to form an eighth branch, and the eighth branch is connected between the first transformer side terminal and the second transformer side terminal of the full-bridge conversion module.

15. The bidirectional resonant direct current-direct current conversion circuit according to claim 6, further comprising:
a second resonant capacitor and a second resonant inductor, wherein the second resonant capacitor, the second resonant inductor, and a primary winding of the transformer are connected in series with each other to form an eighth branch, and the eighth branch is connected between the first transformer side terminal and the second transformer side terminal of the full-bridge conversion module.

16. The bidirectional resonant direct current-direct current conversion circuit according to claim 7, further comprising:
a second resonant capacitor and a second resonant inductor, wherein the second resonant capacitor, the second resonant inductor, and a primary winding of the transformer are connected in series with each other to form an eighth branch, and the eighth branch is connected between the first transformer side terminal and the second transformer side terminal of the full-bridge conversion module.

17. The bidirectional resonant direct current-direct current conversion circuit according to claim 1, wherein a secondary winding of the transformer is a single winding.

18. An uninterruptible power supply, comprising the bidirectional resonant direct current-direct current conversion circuit according to claim 1.

* * * * *